(12) United States Patent
Katsumata

(10) Patent No.: US 10,486,380 B2
(45) Date of Patent: Nov. 26, 2019

(54) APPARATUS AND METHOD FOR PRODUCING LIGHT DIFFUSING LENS

(71) Applicant: Toshiba Kikai Kabushiki Kaisha, Tokyo-to (JP)

(72) Inventor: Ryuichi Katsumata, Numazu (JP)

(73) Assignee: Toshiba Kikai Kabushiki Kaisha, Tokyo-to (JP)

( * ) Notice: Subject to any disclaimer, the term of this patent is extended or adjusted under 35 U.S.C. 154(b) by 288 days.

(21) Appl. No.: 15/510,135

(22) PCT Filed: Sep. 9, 2015

(86) PCT No.: PCT/JP2015/075585
§ 371 (c)(1),
(2) Date: Mar. 9, 2017

(87) PCT Pub. No.: WO2016/039373
PCT Pub. Date: Mar. 17, 2016

(65) Prior Publication Data
US 2017/0305084 A1     Oct. 26, 2017

(30) Foreign Application Priority Data
Sep. 11, 2014   (JP) ................................ 2014-185288

(51) Int. Cl.
*B29D 11/00*       (2006.01)
*B29C 45/16*       (2006.01)
(Continued)

(52) U.S. Cl.
CPC .. *B29D 11/00798* (2013.01); *B29C 45/14336* (2013.01); *B29C 45/162* (2013.01);
(Continued)

(58) Field of Classification Search
CPC . B29D 11/00798; B29C 45/162; B29C 45/72; B29C 45/14336; G02B 1/041; G02B 5/0268
See application file for complete search history.

(56) References Cited

U.S. PATENT DOCUMENTS

| | | | |
|---|---|---|---|
| 5,922,250 A | 7/1999 | Ishikawa et al. | |
| 2004/0262791 A1* | 12/2004 | Sidhu | ............... B29C 45/14 264/1.31 |
| 2015/0226880 A1* | 8/2015 | Blacker | ............... G02B 1/10 428/80 |

FOREIGN PATENT DOCUMENTS

| | | |
|---|---|---|
| JP | H10-138291 | 5/1998 |
| JP | 2008-195005 | 8/2008 |

OTHER PUBLICATIONS

International Preliminary Report on Patentability issued in PCT/JP2015/075585 dated Mar. 14, 2017.
(Continued)

*Primary Examiner* — Mathieu D Vargot
(74) *Attorney, Agent, or Firm* — Dla Piper LLP US

(57) ABSTRACT

It is an object of the present invention to provide a light diffusing lens production apparatus which makes it possible to efficiently produce a high-quality light diffusing lens having enhanced optical properties.
The light diffusing lens production apparatus includes: a pair of molds 15, consisting of a fixed mold 16 and a movable mold 18, which forms a final molded product cavity 22 that defines the shape of a light diffusing lens 14; a mold clamping apparatus 62 in which the pair of molds 15 is attached; a transport device 66, having a chuck means capable of entering and exiting the space between the pair of molds 15 in an open state, which inserts a semifinished molded product 12 for the light diffusing lens 14 into the final molded product cavity 22; a heating device 68, having
(Continued)

a heating means capable of entering and exiting the space between the pair of molds 15 in an open state, which heats the fixed mold 16-facing surface of the inserted semifinished molded product until the surface becomes a molten state; and an injection apparatus 64 which, after clamping of the pair of molds 15, injects a molding material into the final molded product cavity 22 so that the molding material covers the molten surface of the semifinished molded product 12.

16 Claims, 11 Drawing Sheets

(51) Int. Cl.
| | |
|---|---|
| *B29C 45/72* | (2006.01) |
| *B29C 45/14* | (2006.01) |
| *G02B 1/04* | (2006.01) |
| *G02B 5/02* | (2006.01) |
| *B29L 11/00* | (2006.01) |
| *B29L 31/30* | (2006.01) |
| *B29K 33/00* | (2006.01) |
| *B29K 69/00* | (2006.01) |

(52) U.S. Cl.
CPC .............. *B29C 45/72* (2013.01); *G02B 1/041* (2013.01); *G02B 5/0268* (2013.01); *B29C 2045/14877* (2013.01); *B29C 2045/1621* (2013.01); *B29K 2033/12* (2013.01); *B29K 2069/00* (2013.01); *B29L 2011/0016* (2013.01); *B29L 2031/3055* (2013.01)

(56) References Cited

OTHER PUBLICATIONS

Written Opinion (English Translation) issued in PCT/JP2015/075585 dated Dec. 22, 2015.
International Search Report (with English Translation) issued in PCT/JP2015/075585 dated Dec. 22, 2015.
Written Opinion issued in PCT/JP2015/075585 dated Dec. 22, 2015.
English Language Abstract and Translation of JP H10-138291 published May 26, 1998.
English Language Abstract and Translation of JP 2008-195005 published Aug. 28, 2008.

\* cited by examiner

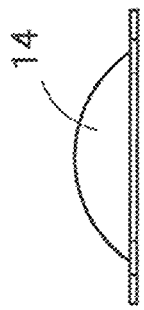  
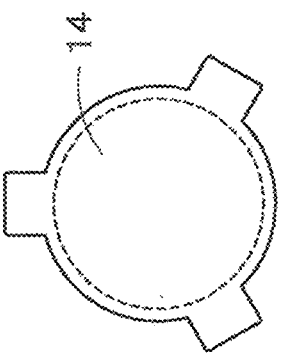 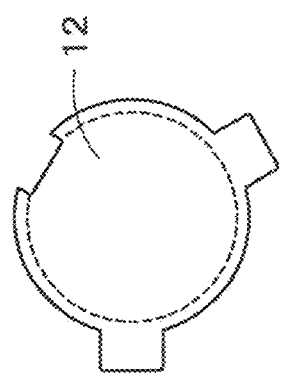 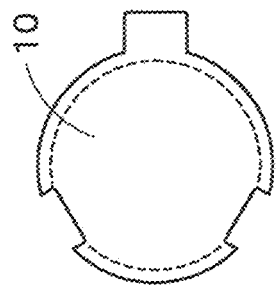
FIG. 1A     FIG. 1B     FIG. 1C

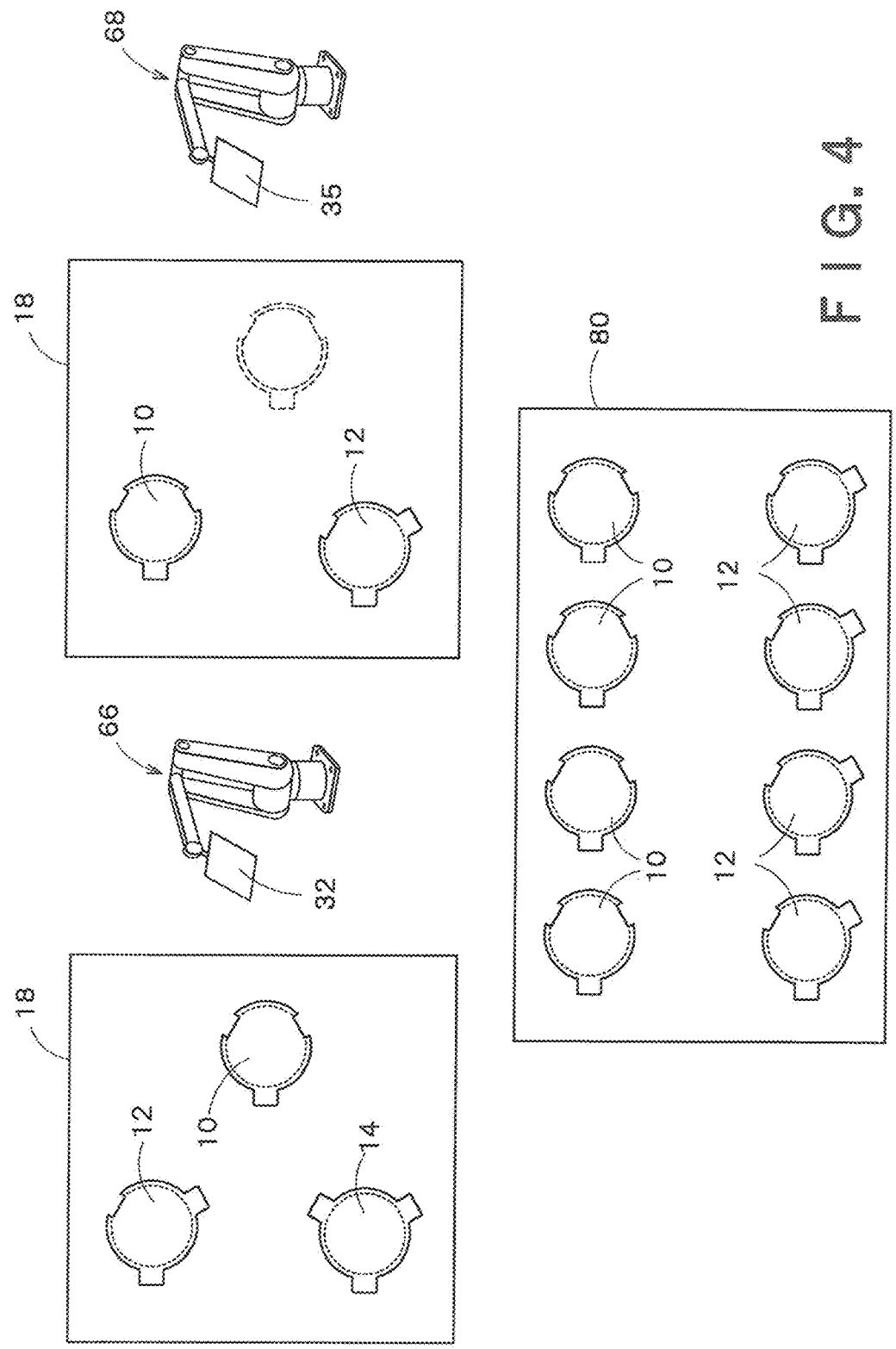

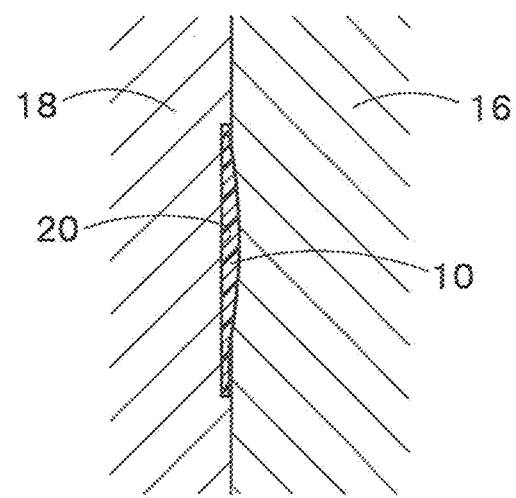
F I G. 6A
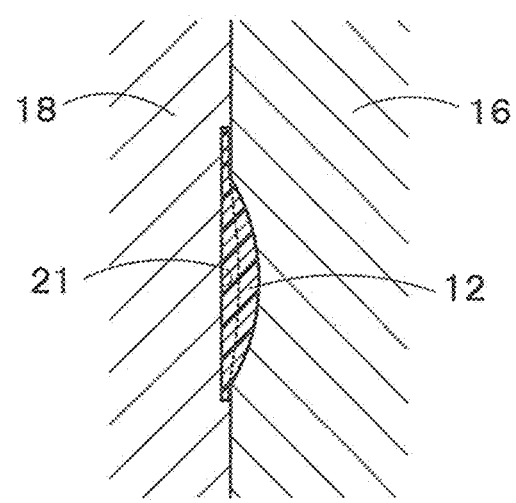
F I G. 6B
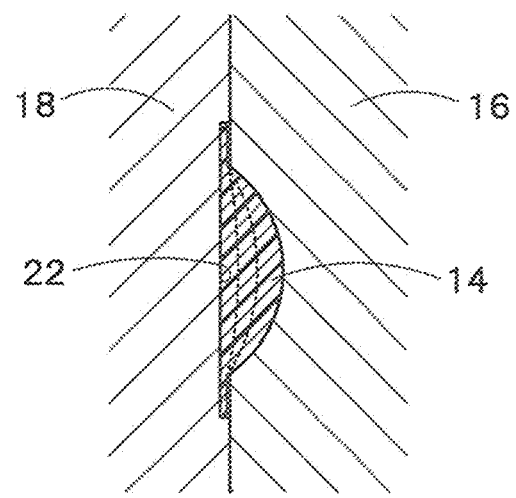
F I G. 6C

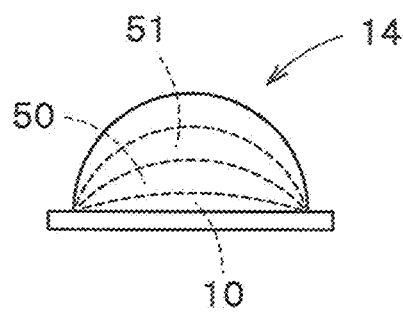
F I G. 7
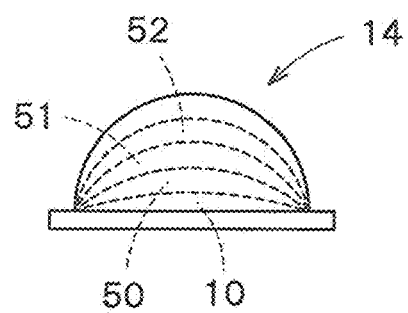
F I G. 8
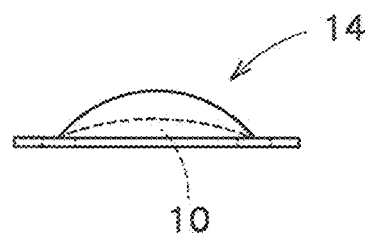
F I G. 9

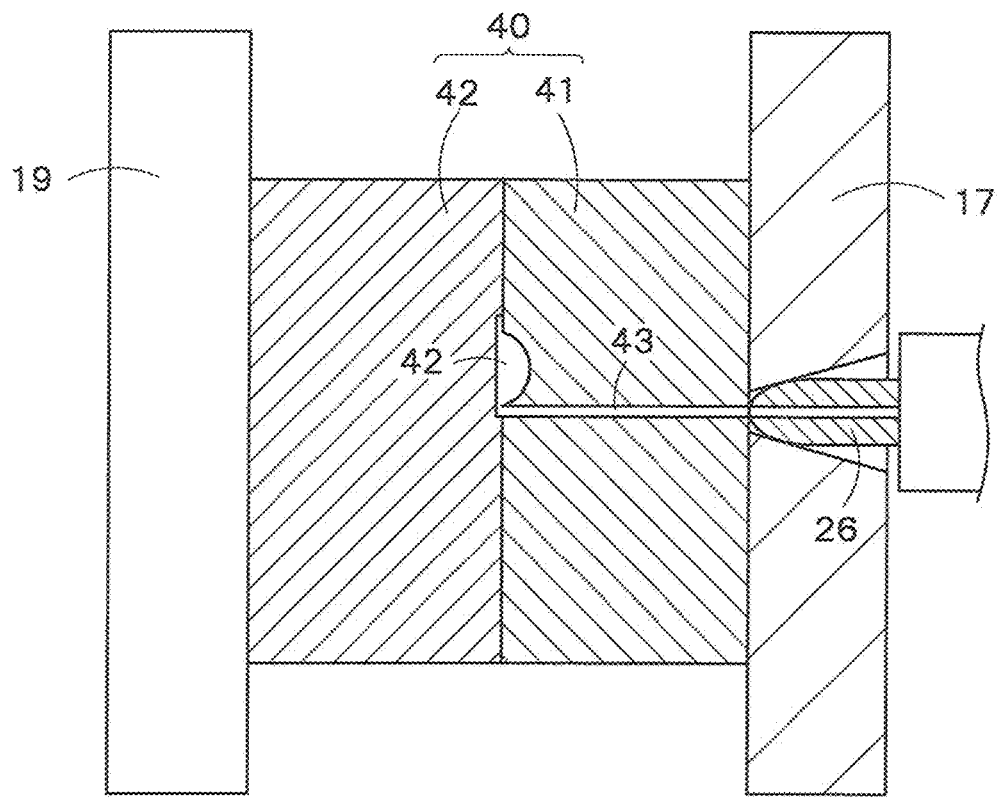
F I G. 10

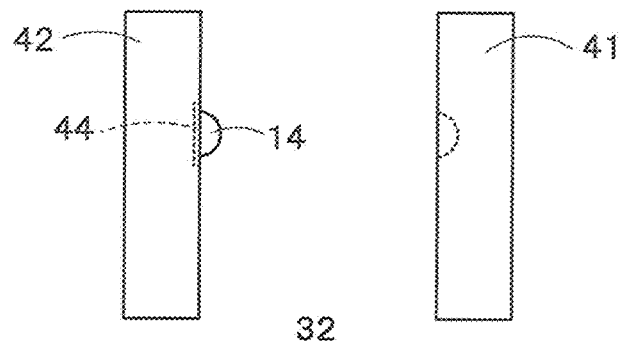
F I G. 11A
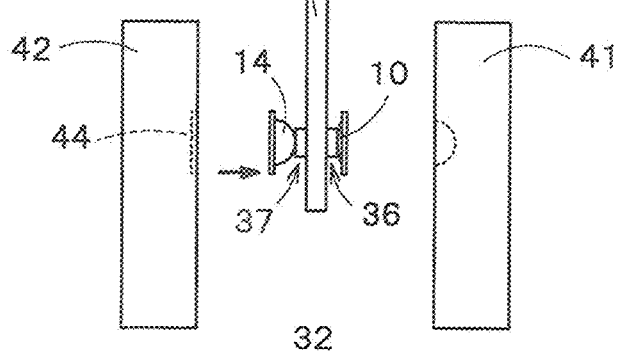
F I G. 11B
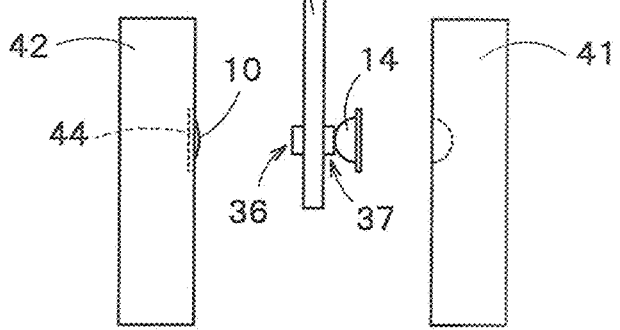
F I G. 11C
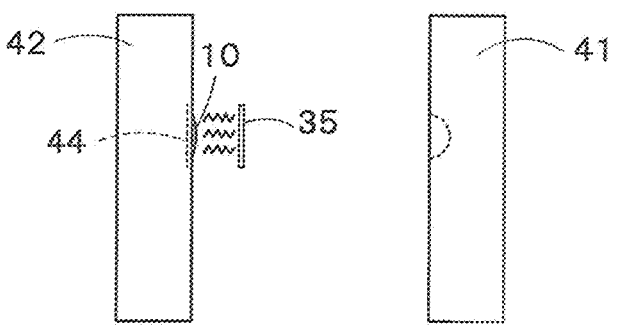
F I G. 11D

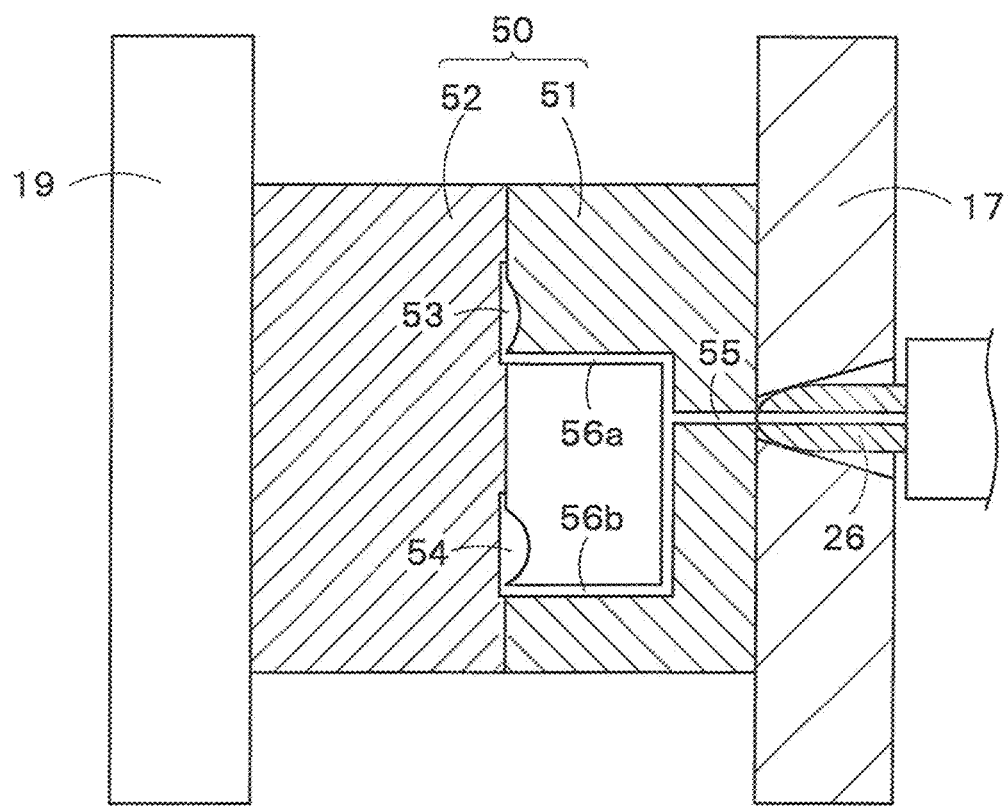
F I G. 12

APPARATUS AND METHOD FOR PRODUCING LIGHT DIFFUSING LENS

CROSS REFERENCE TO RELATED APPLICATIONS

This application is a U.S. National Stage Application of International Application No. PCT/JP2015/075585 filed Sep. 9, 2015, which claims priority from Japanese Patent Application No. 2014-185288 filed Sep. 11, 2014. The entirety of all the above-listed applications are incorporated herein by reference.

TECHNICAL FIELD

The present invention relates to a production apparatus and a production method for producing a light diffusing sheet, e.g, for use in an automotive headlight, by injection molding.

BACKGROUND ART

Injection-molded products include a molded product composed of a unified laminate of a plurality of resin layers (hereinafter referred to as a molded laminate product), for example, a molded product composed of resin layers of a combination of various colors and materials, or a molded product composed or a laminate of resin layers of the same material.

Main conventional molding methods for producing such a molded laminate product include a multicolor molding method and an insert molding method. The multicolor molding method involves injecting a plurality of resin materials from different injection apparatuses into a cavity in a mold, thereby laminating a plurality of resin layers. The insert molding, method involves placing an injection-molded semifinished product as an insert in a cavity in a mold, and then injecting a resin material into the cavity to mold a laminate.

These days optical parts, such as a plastic lens, are commonly produced by injection molding. While it is conventional practice to mold a plastic lens as a single-layer lens, there exist some thick plastic lenses, such as a light diffusing lens for use in outdoor lighting, an automotive headlight, etc.

Such a thick light diffusing lens is required to be a homogeneous transparent body free of optical defects so that light will diffuse uniformly. In the case of molding a lens composed of a laminate of a plurality of resin layers, differences may be produced in physical properties, such as residual stress and internal distortion, between the resin layers even when the same molding material is used for the layers; therefore, it is difficult to mold a high-quality lens. Especially in the case of multicolor molding of a laminate, a difference will be produced in thermal history between the resin layers. Therefore, multicolor molding is not suited to molding of a thick lens such as a light diffusing lens. Thus, at present, a light diffusing lens is usually produced as a single-layer molded product when the lens is produced by injection molding.

However, in the case of injection molding of a single-layer light diffusing lens, defects such as sinks are likely to be formed in a thick portion. Therefore, in a pressure-keeping process, it is necessary to cool a molded product slowly over time. Accordingly, it takes a long time to mold such a lens.

In order to shorten the time for molding a lens and increase the production efficiency, it is presently being studied to mold a lens, composed of not a single layer but a laminate of a plurality of layers, by employing the insert molding method.

For example, PCT International Publication No. WO 2012/132597 has proposed a method which involves forming a plurality of cavities having different volumes in a mold, and repeating injection of a molten resin while sequentially transferring an intermediate molded product as an insert to a cavity having a larger volume than the intermediate molded product, thereby producing a molded laminate product.

SUMMARY OF THE INVENTION

However, the lens molding method disclosed in the above patent document, which is based on insert molding, is solely intended to shorten the time for molding a thick lens and streamline the production process. In the case of insert molding, a molten resin is applied onto a cooled semifinished product, and therefore the temperature of the molten resin decreases and its fluidity becomes low. This results in low adhesion at the interface, leading to non-uniform internal stress in the final product. Thus, the conventional insert molding method can only produce a low-quality plastic lens having lower optical properties.

The present invention has been made in view of the above problems in the prior art. It is therefore an object of the present invention to provide a light diffusing lens production apparatus and method which makes it possible to efficiently produce a high-quality light diffusing lens having enhanced optical properties.

In order to achieve the object, the present invention provides an apparatus for producing a light diffusing lens by molding and laminating at least two resin layers, comprising: a pair of molds, consisting of a fixed mold and a movable mold, which forms a final molded product cavity that defines the shape of a light diffusing lens; a mold clamping apparatus in which the pair of molds is attached; a transport device, having a chuck means capable of entering and exiting the space between the pair of molds in an open state, which inserts a semifinished molded product for the light diffusing lens into the final molded product cavity; a heating device, having a heating means capable of entering and exiting the space between the pair of molds in an open state, which heats the fixed mold-facing surface of the inserted semifinished molded product until the surface becomes a molten state; and an injection apparatus which, after clamping of the pair of molds, injects a molding material into the final molded product cavity so that the molding material covers the molten surface of the semifinished molded product.

The present invention provides also provides a method for producing a light diffusing lens by molding and laminating at least two resin layers, comprising: the insertion step of inserting a semifinished molded product for a light diffusing lens into a final molded product cavity, which defines the shape of the light diffusing lens and which is formed in a pair of molds consisting of a fixed mold and a movable mold, when the pair of molds is in an open state; the heating step of allowing a heating means to enter the space between the pair of molds in an open state, and heating the fixed mold-facing surface of the inserted semifinished molded product until the surface becomes a molten state; the mold clamping step of clamping the pair of molds; the injection step of injecting a molding material into the final molded product cavity so that the molding material covers the molten surface of the semifinished molded product; and the molded product taking-out step of opening the pair of molds, and taking a final molded product out of the pair of molds.

BRIEF DESCRIPTION OF THE DRAWINGS

FIGS. 1A through 1C are side views showing exemplary semifinished molded products and an exemplary light diffusing lens which are produced by a light diffusing lens production apparatus according to a first embodiment of the present invention;

FIG. 4 is a diagram illustrating a manner in which semifinished molded products and a light diffusing lens are taken out of a mold, and semifinished molded products are inserted into the mold and heated;

FIGS. 6A through 6C are cross-sectional views showing a primary molded product, a secondary molded product and a light diffusing lens as a final molded product in a mold;

FIG. 7 is a side view of a light diffusing lens having a four-layer laminate structure produced by the light diffusing lens production apparatus (method) according to the first embodiment of the present invention;

FIG. 8 is a side view of a light diffusing lens having a five-layer laminate structure produced by the light diffusing lens production apparatus (method) according to the first embodiment of the present invention;

FIG. 9 is a side view of a light diffusing lens having a two-layer laminate structure produced by a light diffusing lens production apparatus (method) according to a second embodiment of the present invention;

FIG. 10 is a cross-sectional view of a mold for use in the light diffusing lens production apparatus (method) according to the second embodiment;

FIGS. 11A through 11D are diagrams illustrating process steps in the light diffusing lens production method according to the second embodiment;

FIG. 12 is a cross-sectional view of a mold for use in a light diffusing lens production apparatus (method) according to a variation of the second embodiment.

DESCRIPTION OF EMBODIMENTS

Embodiments of a light diffusing lens production apparatus and method according to the present invention will now be described with reference to the drawings.

First Embodiment

FIGS. 1A through 1C are diagrams showing semifinished molded products and a light diffusing lens as a final molded product, which are produced by a light diffusing lens production apparatus (method) according to a first embodiment.

FIG. 1A shows a primary molded product 10 which is a semifinished molded product composed solely of a first layer. The primary molded product 10 is finally molded into a light diffusing lens, composed of a laminate of e.g. three thermoplastic resin (molding material) layers, for use in outdoor lighting, an automotive headlight, etc.

FIG. 1(B) shows a secondary molded product (intermediate molded product) 12 which has been produced by placing the primary molded product 10 of FIG. 1A as an insert member in a mold, and forming a second layer on the surface of the primary molded product 10. In the secondary molded product 12, the lens portion is convex-curved.

FIG. 1(C) shows a tertiary molded product which has been produced by forming a third layer on the surface of the secondary molded product 12 of FIG. 1B as an insert member. In this embodiment the primary molded product 10 and the secondary molded product 12 are semifinished molded products which serve as insert members, and the tertiary molded product is a light diffusing lens 14 as a final molded product.

Figure 2:
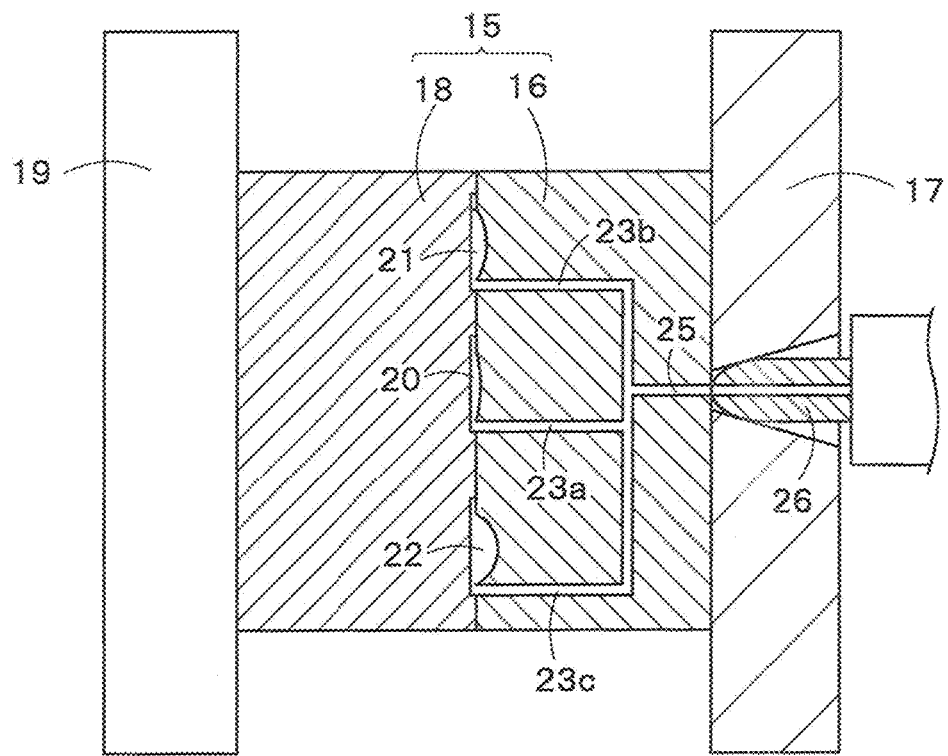
FIG. 2 is a cross-sectional view of a mold for use in the light diffusing lens production apparatus according to the first embodiment.

FIG. 2 is a diagram showing a mold to be used in a mold clamping apparatus of an injection molding machine in order to mold the light diffusing lens 14. The mold 15 includes a fixed mold 16 and a movable mold 18. The fixed mold 16 is mounted to a fixed platen 17 of the mold clamping apparatus, and the movable mold 18 is mounted to a movable platen 19.

The following three cavities are formed in the opposing surfaces of the fixed mold 16 and the movable mold 18: a primary molded product cavity 20 for molding the primary molded product 10 shown in FIG. 1A; a secondary molded product cavity 21 for molding the secondary molded product 12 shown in FIG. 1B; and a final molded product cavity 22 for molding the final molded product, the light diffusing lens 14 shown in FIG. 1C.

Runners 23a, 23b, 23c, which communicate with the primary molded product cavity 20, the secondary molded product cavity 21 and the final molded product cavity 22, respectively, are formed in the fixed mold 16 such that they branch from a sprue 25. An injection nozzle 26 of the below-described injection apparatus is connected to the opening of the sprue 25 so that a molten resin (molding material) is injected into the mold.

The molten resin is injected into the primary molded product cavity 20, the secondary molded product cavity 21 and the final molded product cavity 22 either simultaneously or under control by a valve gate of a hot runner, whereby the primary molded product 10, the secondary molded product 12 and the final molded product 14 are molded at a time.

A production apparatus for performing a light diffusing lens molding method according to this embodiment will now be described with reference to FIG. 3.

Figure 3:
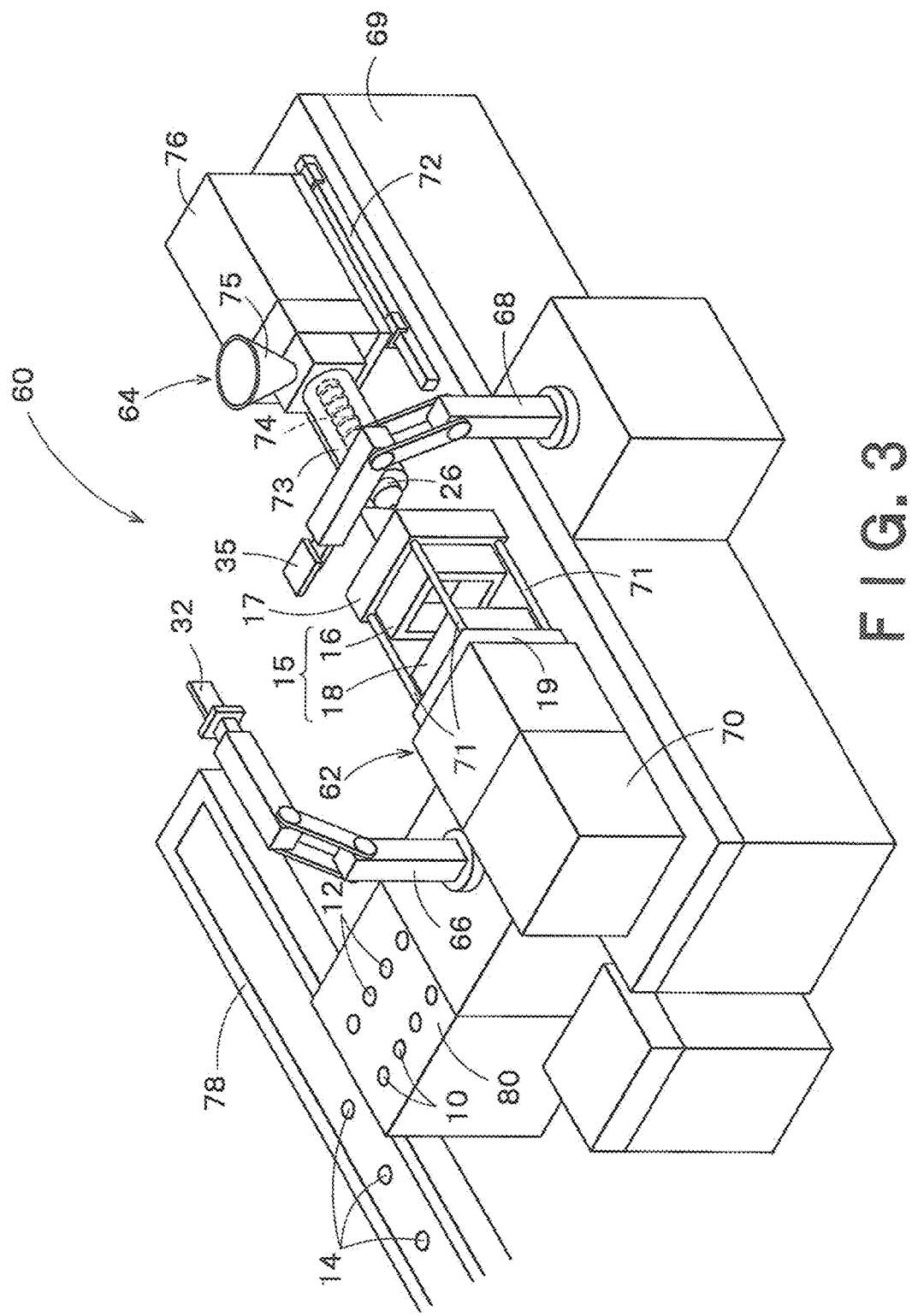
FIG. 3 is a perspective view of the light diffusing lens production apparatus according to the first embodiment.

In FIG. 3, reference numeral 60 denotes the entire light diffusing lens production apparatus. The light diffusing lens production apparatus 60 includes a mold clamping apparatus 62, an injection apparatus 64, a first multi-axis robot 66 that operates as a transport device for placing a semifinished molded product for the light diffusing lens 14, as an insert member, in a cavity of the mold 15, and a second multi-axis robot 68 that operates as a heating device for heating the surface of the inserted semifinished molded product.

The mold clamping apparatus 62 includes a drive section 70 installed on a base 69 and having a not-shown toggle link mechanism for moving the movable platen 19 back and forth to open/close the mold, and clamping the mold after closing the mold. As shown in FIG. 2, the fixed mold 16 is mounted to the fixed platen 17, and the movable mold 18 is mounted to the movable platen 19. The mold 15, consisting of the fixed mold 16 and the movable mold 18, has the above-described construction. Reference numeral 71 denotes tie bars which are pulled by the toggle link mechanism after closing the mold and generate a mold clamping force.

The injection apparatus 64 is movably installed on the base 69 via rails 72. The injection apparatus 64 includes a barrel 73, a screw 74 housed in the barrel 73, a hopper 75 for feeding a resins as a molding material into the barrel 73, and a drive 76 for rotating and moving back and forth the screw 73.

An injection nozzle 26 is provided at the front end of the barrel 73. The injection apparatus 64 advances, and the injection nozzle 26 comes to connect with the fixed mold 16, as shown in FIG. 2. When a molten resin has been weighed and accumulated in front of the screw 74 in the barrel 73, the molten resin is injected from the injection nozzle 26 into the cavities in the mold 15 by advancing the screw 74.

The first multi-axis robot 66 and the second multi-axis robot 68 will now be described.

The first multi-axis robot (transport device) 66 engages in the process steps of taking a primary molded product 10, a secondary molded product 12 and a light diffusing lens 14 as a final molded product, as shown in FIGS. 1A through 1C, out of the open mold 15, and placing another primary molded product 10 and another secondary molded product 12 as insert members in the mold 15.

In this embodiment a light diffusing lens 14 as a final product, which has been taken out of the mold 15, is carried to a transport conveyer 78 by the first multi-axis robot 66. A primary molded product 10 and a secondary molded product 12, which have been taken out of the mold 15, are temporarily placed (stored) by the first multi-axis robot 66 on a temperature adjustment stage (storage section) 80, disposed in a robot access area, where the temperatures of the primary molded product 10 and the secondary molded product 12 are adjusted to a predetermined temperature lower than the heat distortion temperature.

As shown in FIG. 4, a plurality of primary molded products and 10 and a plurality of secondary molded products 12, whose temperatures have been adjusted to a temperature lower than the heat distortion temperature, are arranged on the temperature adjustment stage 80. The first multi-axis robot 66 takes a primary molded product 10 and a secondary molded product 12, whose temperatures have reached a predetermined temperature (appropriate temperature), out of the temperature adjustment stage 80, and set them as insert members in the movable mold 18. The primary molded product 10 is set as an insert member in the secondary molded product cavity 21, and the secondary molded product 12 is set as an insert member in the final molded product cavity 22.

In this embodiment, in addition to the first multi-axis robot 66 which performs the operation of taking semifinished products and a final product out of the mold, and inserting semifinished products into the mold, the second multi-axis robot (heating device) 68 is installed which performs the operation of heating a primary molded product 10 and a secondary molded product 12, semifinished products that have been inserted into the movable mold 18. An infrared heater 35 or the like is provided as a heating means at the front end of an arm of the second multi-axis robot 68.

Process steps in a light diffusing lens molding method, performed by the thus-constructed light diffusing lens production apparatus, will now be described in order with reference to FIGS. 5A through 5D.

In the light diffusing lens production method according to this embodiment, molding of a primary molded product 10, molding of a secondary molded product 12, and molding of a light diffusing lens 14 as a final molded product are performed in parallel in order to streamline the production process. For easier understanding of the process steps, a description is started at a time when the immediately preceding cycle of molding of a primary molded product 10, a secondary molded product 12 and a light diffusing lens 14 is completed.

Figure 5A:
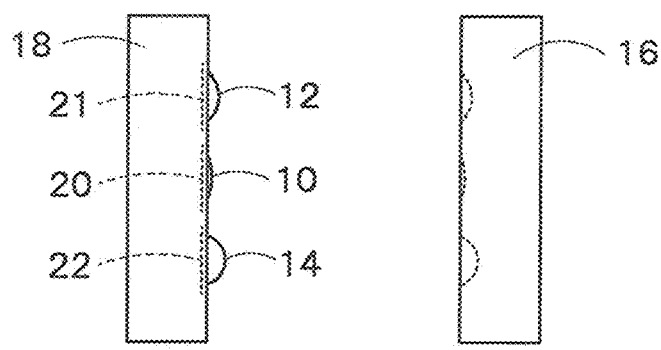
FIGS. 5A through 5D are diagrams illustrating process steps in a light diffusing lens production method according to the first embodiment.

First, FIG. 5A illustrates the step of opening the movable mold 18 from the fixed mold 16 after completion of a pressure transmission step. At this time, the primary molded product 10, the secondary molded product 12 and the light diffusing lens 14 remain in the movable mold 18.

Figure 5B:
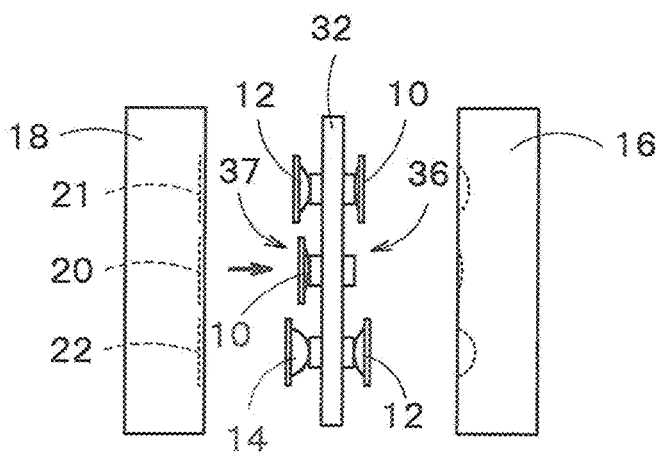

FIG. 5B illustrates the step of taking the primary molded product 10, the secondary molded product 12 and the light diffusing lens 14 out of the movable mold 18. In this embodiment the arm of the first multi-axis robot 66 has a two-stage chuck 32. The first-stage chuck 36 is a chuck for attracting and holding a primary molded product 10 and a secondary molded product 12 which have been placed on the temperature adjustment stage 80 and whose temperatures have been adjusted to a predetermined temperature. The second-stage chuck 37 is a chuck for attracting and holding a primary molded product 10, a secondary molded product 12 and a light diffusing lens 14 as a final molded product which have been molded, and taking them out of the movable mold 18.

In this embodiment the first multi-axis robot 66, while holding the temperature-adjusted primary molded product 10 and secondary molded product 12 with the first-stage chuck 36, allows the chuck 32 to enter the space between the fixed mold 16 and the movable mold 18 of the open mold. The first multi-axis robot 56 then attracts and holds the primary molded product 10, the secondary molded product 12 and the light diffusing lens 14 with the second-stage chuck 37, and takes them out of the movable mold 18.

Figure 5C:
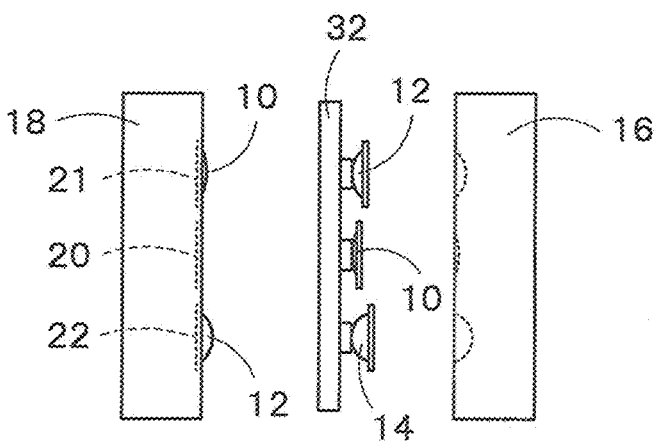

Next, as shown in FIG. 5C, the first multi-axis robot 66 turns the chuck 32 by 180 degrees, and places the primary molded product 10 and the secondary molded product 12, which have been held by the first-stage chuck 36, in the secondary molded product cavity 21 and in the final molded product cavity 22, respectively, as insert members.

By using the chuck 32, having the two front/back chucks, in the above-described manner, the taking-out of the semifinished molded products and the light diffusing lens 14 and the setting of the semifinished products as insert members in the movable mold 18 can be performed successively in the same process step.

Thereafter, the primary molded product 10 and the secondary molded product 12 which have been taken out are transported to the temperature adjustment stage 80, where their temperatures are adjusted to a predetermined temperature, and they wait until they are inserted into the mold 5. When a polycarbonate (PC) resin is used as a molding material, the heat distortion temperature is 130° C. to 140° C. though it may somewhat vary depending on the quality and the grade of the resin. In the case of an acrylic resin (e.g. PMMA), the heat distortion temperature is 70° C. to 100° C. Depending on the type of the molding material, the temperatures of the primary molded product 10 and the secondary molded product 12 are adjusted to a temperature which is somewhat lower than the heat distortion temperature.

In this embodiment the light diffusing lens 14 as a final molded product is sent to the transport conveyer 78 shown in FIG. 3.

Figure 5D:
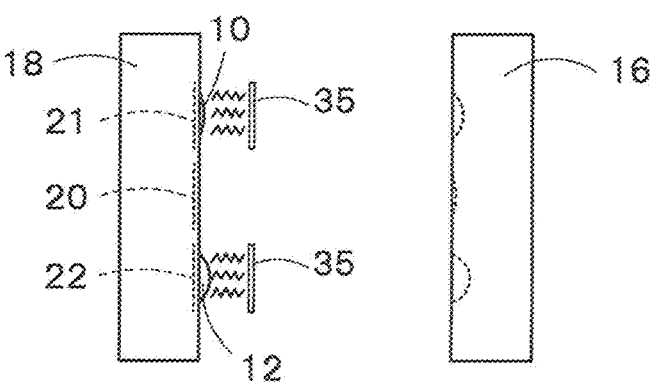

FIG. 5D shows the step of heating semifinished molded products, the most important step in the light diffusing lens 14 production process according to this embodiment. The heating objects are the primary molded product 10 which has been placed as an insert member in the secondary molded product cavity 21, and the secondary molded product 12 which has been placed as an insert member in the final molded product cavity 22.

The second multi-axis robot 68 shown in FIG. 3 allows the infrared heater 35 or the like, provided as a (external) heating means at the front end of the arm, to enter the space between the fixed mold 16 and the movable mold 18 of the open mold.

In the primary molded product 10 and the secondary molded product 12 as semifinished molded products, the portion to be heated is the surface to which a resin layer is to be laminated in the next step, i.e. the entire surface facing the fixed mold 16. The surfaces of the primary molded product 10 and the secondary molded product 12 are heated to a temperature higher than the melting temperature of the resin as a molding material so that only the surfaces of the molded products become a molten state. The melting temperature is about 240° C. when the thermoplastic resin as a molding material is a polycarbonate (PC) resin, and about 160° C. in the case of an acrylic (PMMA) resin. The upper limit of the heating temperature is equal to the molding temperature. When the surfaces of the primary molded product 10 and the secondary molded product 12 have become a molten state, the second multi-axis robot 68 withdraws the infrared heater 35 from the mold 15.

Next, the mold 15 is closed and clamped. Thereafter, the injection apparatus 64 shown in FIG. 3 is connected to the mold 15, and the filling step (injection filling step) of injecting a resin (molding material) into the mold 15 is performed.

In this embodiment, all the cavities in the mold 15, i.e. the primary molded product cavity 20, the secondary molded product cavity 21 and the final molded product cavity 22, are simultaneously filled with a molten resin material by the filling step. In this embodiment the same resin is injected into the cavities from the single injection apparatus.

FIG. 6A shows a cross section of a primary molded product 10 in the primary molded product cavity 20, FIG. 6B shows a cross section of a secondary molded product 12 in the secondary molded product cavity 21, and FIG. 6C shows a cross section of a light diffusing lens 14 in the final molded product cavity 22.

As shown in FIG. 6A, the primary molded product 10 composed of a single resin layer is formed in the primary molded product cavity 20 by the filling of the molten resin.

On the other hand, as shown in FIG. 6B, the molten resin is filled into the secondary molded product cavity 21 in which the primary molded product 10 has been placed as an insert member; therefore, a second resin layer is laminated to the surface of the primary molded product 10. Since the surface of the primary molded product 10 has been heated and has become a molten state, the injected molten resin can adhere to the interface with the primary molded product 10 in a homogeneously fused state. Further, there is no decrease in the temperature of the molten resin upon contact with the surface of the primary molded product 10. Therefore, the molten resin is filled into the secondary molded product cavity 21 while maintaining good fluidity without partial solidification.

The injected molten resin is thus filled into the secondary molded product cavity 21 while maintaining sufficient adhesion and fluidity at the interface with the primary molded product 10. Accordingly, a pressure is transmitted uniformly within the molten resin. This can avoid the occurrence of the phenomenon of high residual stress in a portion, such as a portion near a gate, and low residual stress in the other portion. Therefore, in a pressure transmission step which is performed after the filling step and in which the molten resin is solidified while applying pressure to the resin, non-uniform residual stress can be prevented from remaining in the second layer, thereby achieving a uniform distribution of stress.

Similarly, as shown in FIG. 6C, the molten resin is filled into the final molded product cavity 22 in which the secondary molded product 12 has been placed as an insert member; a third resin layer is laminated to the surface of the secondary molded product 12.

Also in the final molded product cavity 22, the surface of the secondary molded product 12 has been heated and has become a molten state, and therefore the injected molten resin can adhere to the interface with the secondary molded product 12 in a homogeneously fused state. The injected molten resin is thus filled into the tertiary molded product cavity 22 while maintaining sufficient adhesion and fluidity at the interface with the secondary molded product 12. Accordingly, a pressure is transmitted uniformly within the molten resin. Therefore, in a pressure transmission step which is performed after the filling step and in which the molten resin is solidified while keeping the pressure, non-uniform residual stress can be prevented from remaining in the third layer, thereby achieving a uniform distribution of stress.

The lamination of the light diffusing lens 14 is preferably performed in such a manner that, as in this embodiment, the protrusion of the convex curve of the lens increases stepwise from the primary molded product 10 which constitutes the bottom portion of the light diffusing lens 14. Such a manner of lamination can stabilize the posture of a semifinished molded product when transporting it to the temperature adjustment stage 80, and can facilitate placement of the semifinished molded product on the temperature adjustment stage 80.

Upon completion of the filling step, the process proceeds to the above-described pressure transmission step while keeping the pressure.

After the molten resin in the primary molded product cavity 20, the secondary molded product cavity 21 and the tertiary molded product cavity 22 is solidified, the mold opening step shown in FIG. 5A and the molded product taking-out step shown in FIG. 5B are performed. Subsequently, the same molding cycle is repeated successively.

As described hereinabove, according to this embodiment, the surface of the primary molded product 10, the first semifinished product, is heated into a molten state before the second layer is laminated to the primary molded product 10, and the surface of the secondary molded product 12, the next semifinished product, is likewise heated into a molten state before the third layer is laminated to the secondary molded product 12. This makes it possible to mold the light diffusing lens 14, the final molded product, which is a high-quality plastic lens having excellent optical properties and having a uniform stress distribution despite the large thickness. Further, the primary molded product 10, the secondary molded product 12 and the light diffusing lens 14, the final molded product, can be molded simultaneously in parallel by using the same mold 15. Thus, the thick light diffusing lens 14 can be produced with high efficiency.

Further, in this embodiment the primary molded product 10 and the secondary molded product 12 as semifinished molded products are temporarily placed (stored) on the temperature adjustment stage (storage section) 80 capable of temperature adjustment. This can prevent the primary molded product 10 and the secondary molded product 12 as semifinished molded products that are to serve as insert members from being completely solidified, thereby making it possible to smoothly perform heating in the later heating step.

While the above-described embodiment relates to molding of the light diffusing lens 14 composed of a laminate of three layers, a light diffusing lens 14 composed of a laminate of four or five layers can also be molded by using a mold having cavities that define the shapes of molded products at various lamination stages.

FIG. 7 shows a light diffusing lens 14 composed of a four-layer laminate. In the case of this light diffusing lens 14, a secondary molded product 50 and a tertiary molded product 51 are intermediate molded products between the primary molded product 10 and the final molded product. Each semifinished molded product serves as an insert member in molding of a product at the next lamination stage: the primary molded product 10 serves as an insert member in molding of the secondary molded product 50; the secondary molded product 50 serves as an insert member in molding of the tertiary molded product 51; and the tertiary molded product 51 serves as an insert member in molding of the final molded product.

FIG. 8 shows a light diffusing lens 14 composed of a five-layer laminate. In the case of this light diffusing lens 14, a secondary molded product 50, a tertiary molded product 51 and a quaternary molded product 52 are intermediate molded products between the primary molded product 10 and the final molded product. Each semifinished molded product serves as an insert member in molding, of a product at the next lamination stage: the primary molded product 10 serves as an insert member in molding of the secondary molded product 50; the secondary molded product 50 serves as an insert member in molding of the tertiary molded product 51; the tertiary molded product 51 serves as an insert member in molding of the quaternary molded product 52; and the quaternary molded product 52 serves as an insert member in molding of the final molded product.

The foregoing is a description of a process for molding a light diffusing lens 14 composed of a laminate of three, four or five resin layers. The description is started at a time when the immediately preceding cycle of molding of semifinished products and a light diffusing lens 14 is completed.

At the start of a first molding cycle, no semifinished molded product to be used as an insert member has yet been molded. Therefore, semifinished molded products are prepared in a preliminary molding process which is different from the above-described process for molding the final molded product, and are subjected to temperature adjustment performed in the above-described manner in advance of the first molding cycle. The first molding cycle starts by placing the thus-prepared semifinished molded products in the cavities for molding of products at the next lamination stage.

Second Embodiment

In the above-described first embodiment, a final molded product 14, which is a light diffusing lens composed of a laminate of three or more layers, is molded in such a manner that a secondary molded product 12 is lamination-molded using a primary molded product 10 as an insert member, and the secondary molded product 12 is then used as an insert member.

On the other hand, in the below-described second embodiment, a light diffusing lens having a two-layer laminate structure is molded using a primary molded product 10 as an insert member.

FIG. 9 shows a light diffusing lens 14 produced by a production apparatus (method) according to the second embodiment. As in the first embodiment, a primary molded product 10 which serves as an insert member constitutes the bottom portion of the lens: a convex-curved lens portion is formed by laminating a thermoplastic resin layer to the primary molded product 10.

FIG. 10 is a diagram showing a mold for use in molding of the light diffusing lens. The same reference numerals as used for the first embodiment shown in FIG. 2 are used to refer to the same components, and a detailed description thereof is omitted.

In the mold 40 shown in FIG. 10, a final molded product cavity 44, which defines the shape of a light diffusing lens 14, is formed by the opposing surfaces of a fixed mold 41 and a movable mold 42. A runner 43 communicates with the final molded product cavity 44. A primary molded product 10 is to be inserted into the final molded product cavity 44. The primary molded product 10 has been molded in a different injection molding machine, and its temperature has been adjusted.

A molding process using the mold 40 will now be described with reference to FIGS. 11A through 11D.

FIG. 11A illustrates the step of opening the movable mold 42 from the fixed mold 41 after completion of the preceding molding cycle. A light diffusing lens 14 as a final molded product, produced in the preceding molding cycle, is waiting for its removal from the mold.

Next, as shown in FIG. 11B, the chuck 32 transports a primary molded product 10 from the temperature adjustment stage 80 shown in FIG. 3 to between the fixed mold 41 and the movable mold 42 and, while holding the primary molded product 10, attracts and holds the light diffusing lens 14 as a final molded product and takes it out of the movable mold 42. Next, as shown in FIG. 11C, the entire chuck 32 turns 180 degrees and places the primary molded product 10, held by the first stage chuck 36, as an insert member in the cavity 44. Thereafter, the light diffusing lens 14 as a final molded product is transported to the transport conveyer 78.

Next, as shown in FIG. 11D, the infrared heater 35 enters the space between the fixed mold 41 and the movable mold 42, and heats the surface of the primary molded product 10 until it becomes a molten state. The mold is then closed and clamped. Thereafter, as shown in FIG. 10, the injection nozzle 26 of the injection apparatus 64 is connected to the mold, and a molding material is filled into the cavity 44.

In the above-described embodiment, the primary molded product 10 which has been molded in a different molding apparatus is used as an, insert member. However, as in the first embodiment, a primary molded product 10 and a light diffusing lens 14 as a final molded product may be molded simultaneously using a mold as shown in FIG. 12.

In the mold 50 shown in FIG. 12, a primary molded product cavity 53, which defines the shape of a primary molded product 10, and a final molded product cavity 54, which defines the shape of a light diffusing lens 14, are formed by the opposing surfaces of a fixed mold 51 and a movable mold 52. Runners 56a, 56b, which branch from a runner 55 and communicate with the primary molded product cavity 53 and the final molded product cavity 54, respectively, are formed in the fixed mold 51.

A molding process using the mold 50 will now be described with reference to FIGS. 13A through 13D.

Figure 13A:
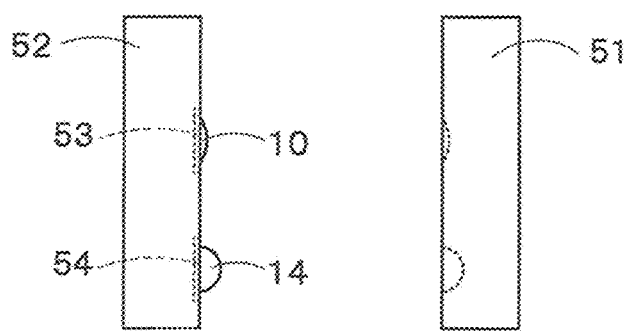
FIGS. 13A through 13D are diagrams illustrating process steps in the light diffusing lens production method according to the variation of the second embodiment.

FIG. 13A illustrates the step of opening the movable mold 52 from the fixed mold 51 after completion of the preceding molding cycle. A primary molded product 10 and a light diffusing lens 14 as a final molded product, which have been produced in the preceding molding cycle, are waiting for their removal from the mold.

Figure 13B:
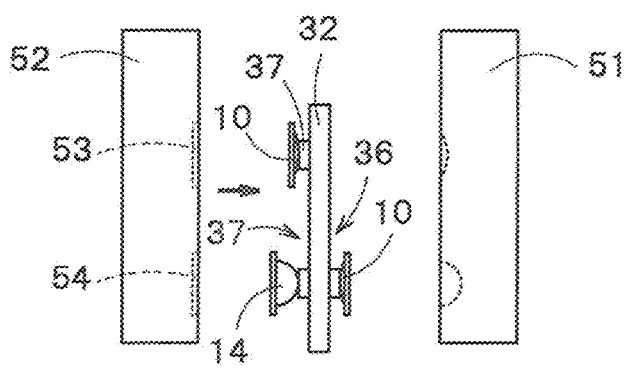
Figure 13C:
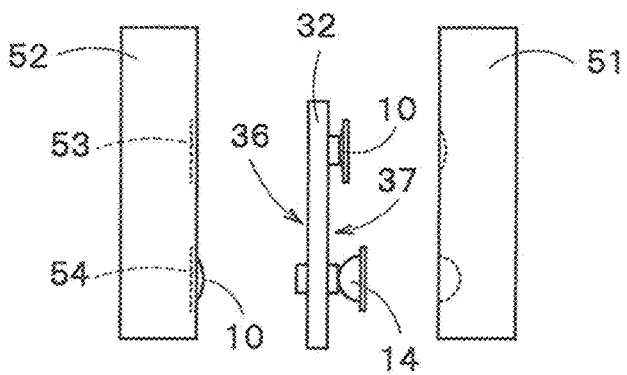

Next, as shown in FIG. 13B, the first-stage chuck 36 of the chuck 32 transports a temperature-adjusted primary molded product 10 from the temperature adjustment stage 80 to between the fixed mold 51 and the movable mold 52, while the second-stage chuck 37 attracts and holds the light diffusing lens 14 as a final molded product and takes it out of the movable mold 52. Next, as shown in FIG. 13C, the entire chuck 32 turns 180 degrees and places the primary molded product 10, held by the first-stage chuck 36, as an insert member in the final molded product cavity 54. Thereafter, the primary molded product 10 that has been molded and the light diffusing lens 14 as a final molded product are transported to the transport conveyer 78.

Figure 13D:
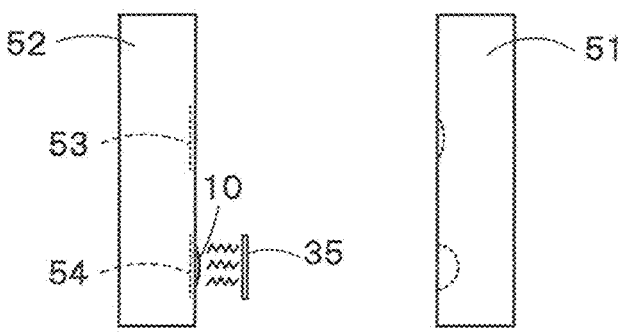

Next, as shown in FIG. 13D, the infrared heater 35 enters the space between the fixed mold 51 and the movable mold 52, and heats the surface of the primary molded product 10 until it becomes a molten state. The mold is then closed and clamped. Thereafter, as shown in FIG. 12, the injection nozzle 26 of the injection apparatus 64 is connected to the mold, and the same resin molding material is simultaneously filled into the primary molded product cavity 53 and the final molded product cavity 54. In this manner, the primary molded product 10 as a semifinished molded product and the light diffusing lens 14 as a final molded product can be molded simultaneously in parallel.

As described hereinabove, the surface of the primary molded product 10, the first semifinished product, is heated into a molten state before the next, second layer is laminated to the primary molded product 10. This makes it possible to mold the light diffusing lens 14, the final molded product, as a high-quality plastic lens having excellent optical properties and having a uniform stress distribution.

While a light diffusing lens production apparatus and method according to the present invention has been described with reference to preferred embodiments in which a lens, composed of a laminate of 2, 3, 4 or 5 resin layers is molded, the present invention can also be applied in a molding process which involves molding and laminating more than 5 resin layers to form a light diffusing lens.

The invention claimed is:

1. An apparatus for producing a light diffusing lens by molding and laminating at least two resin layers, comprising:
    a pair of molds, including a fixed mold and a movable mold, which forms a final molded product cavity that defines the shape of a light diffusing lens;
    a mold clamping apparatus in which the pair of molds is attached;
    a transport device, including a chuck capable of entering and exiting the space between the pair of molds in an open state, which inserts a semifinished molded product for the light diffusing lens into the final molded product cavity;
    a heating device, including a heater capable of entering and exiting the space between the pair of molds in an open state, which heats the fixed mold-facing surface of the inserted semifinished molded product until the surface becomes a molten state; and
    an injection apparatus which, after clamping of the pair of molds, injects a molding material into the final molded product cavity so that the molding material covers the molten surface of the semifinished molded product, wherein the pair of molds has at least one semifinished molded product cavity in addition to the final molded product cavity, the at least one semifinished molded product cavity forming the semifinished molded product and wherein the fixed mold has a flow path which branches into a path that communicates with the final molded product cavity and a path that communicates with the at least one semifinished molded product cavity.

2. The apparatus for producing a light diffusing lens according to claim 1, wherein the pair of molds includes, as the at least one semifinished molded product cavity, a primary molded product cavity and at least one cavity for an intermediate molded product between a primary molded product and a final molded product.

3. The apparatus for producing a light diffusing lens according to claim 2, wherein the at least one intermediate molded product cavity includes at least two cavities which each define the shape of an intermediate molded product.

4. The apparatus for producing a light diffusing lens according to claim 1, wherein the heater of the heating device is capable of simultaneously heating the surfaces of products which have been inserted into the at least one semifinished molded product cavity and the semifinished molded product which has been inserted into the final molded product cavity.

5. The apparatus for producing a light diffusing lens according to claim 1, further comprising a storage section for temporarily storing the semifinished molded product(s) that has been taken out of the pair of molds by the transport device, and adjusting the temperature of the semifinished molded product(s).

6. The apparatus for producing a light diffusing lens according to claim 5, wherein the chuck of the transport device is capable of successively performing the operation of taking the semifinished molded product(s) and the final molded product out of the pair of molds and the operation of inserting the temperature-adjusted semifinished molded product(s), which has been transported from the storage section, into the cavity(ies).

7. A method for producing a light diffusing lens by molding and laminating at least two resin layers, comprising:
    an insertion step of inserting a semifinished molded product for a light diffusing lens into a final molded product cavity, which defines the shape of the light diffusing lens and which is formed in a pair of molds consisting of a fixed mold and a movable mold, when the pair of molds is in an open state;
    a heating step of allowing a heater to enter the space between the pair of molds in an open state, and heating the fixed mold-facing surface of the inserted semifinished molded product until the surface becomes a molten state;
    a mold clamping step of clamping the pair of molds;
    an injection step of injecting a molding material into the final molded product cavity so that the molding material covers the molten surface of the semifinished molded product; and
    a molded product taking-out step of opening the pair of molds, and taking a final molded product out of the pair of molds.

8. The method for producing a light diffusing lens according to claim 7, wherein the pair of molds has at least one semifinished molded product cavity in addition to the final molded product cavity, the at least one semifinished molded product cavity forming the semifinished molded product, and wherein in the injection step, the molding material is simultaneously injected into the final molded product cavity and the at least one semifinished molded product cavity from a single injection apparatus.

9. The method for producing a light diffusing lens according to claim 8, wherein the pair of molds has, as the at least one semifinished molded product cavity, a primary molded product cavity and at least one cavity for an intermediate molded product between a primary molded product and a final molded product, and wherein in the insertion step, the primary molded product is inserted into the intermediate molded product cavity and the intermediate molded product is inserted into the final molded product cavity.

10. The method for producing a light diffusing lens according to claim 9, wherein the at least one intermediate molded product cavity consists of at least two cavities which each define the shape of an intermediate molded product at the next lamination stage, and wherein in the insertion step, the primary molded product and the intermediate molded products are each inserted into a cavity that defines the shape of a molded product.

11. The method for producing a light diffusing lens according to claim 8, wherein in the heating step, the surfaces of products which have been inserted into the at least one semifinished molded product cavity and the semifinished molded product which has been inserted into the final molded product cavity are simultaneously heated.

12. The method for producing a light diffusing lens according to claim 8, wherein the semifinished molded product(s) that has been taken out of the pair of molds by the transport device in the molded product taking-out step is temporarily stored in a storage section where the temperature of the semifinished molded product(s) is adjusted, and the semifinished molded product(s) is inserted into the cavity(ies) after completion of the temperature adjustment.

13. The method for producing a light diffusing lens according to claim 12, wherein taking-out of the semifinished molded product(s) and the final molded product in the molded product taking-out step and insertion of the temperature-adjusted semifinished product(s) that has been transported from the storage section into the cavity(ies) in the insertion step in the next cycle are performed successively.

14. The apparatus for producing a light diffusing lens according to claim 2, wherein the heater of the heating device is capable of simultaneously heating the surfaces of products which have been inserted into the at least one semifinished molded product cavity and the semifinished molded products which have been inserted into the final molded product cavity.

15. The apparatus for producing a light diffusing lens according to claim 3, wherein the heater of the heating device is capable of simultaneously heating the surfaces of products which have been inserted into the at least one semifinished molded product cavity and the semifinished molded products which have been inserted into the final molded product cavity.

16. The apparatus for producing a light diffusing lens according to claim 2, further comprising a storage section for temporarily storing the semifinished molded product(s) that has been taken out of the pair of molds by the transport device, and adjusting the temperature of the semifinished molded product(s).

* * * * *